US008718830B2

(12) United States Patent
Smith (10) Patent No.: US 8,718,830 B2
(45) Date of Patent: May 6, 2014

(54) OPTIMIZED PROTECTION COORDINATION OF ELECTRONIC-TRIP CIRCUIT BREAKER BY SHORT CIRCUIT CURRENT AVAILABILITY MONITORING

(75) Inventor: Timothy Lee Smith, Seneca, SC (US)

(73) Assignee: Schneider Electric USA, Inc., Palatine, IL (US)

( * ) Notice: Subject to any disclaimer, the term of this patent is extended or adjusted under 35 U.S.C. 154(b) by 410 days.

(21) Appl. No.: 13/227,614

(22) Filed: Sep. 8, 2011

(65) Prior Publication Data

US 2013/0066478 A1 Mar. 14, 2013

(51) Int. Cl.

| G05D 3/12 | (2006.01) |
|---|---|
| G05D 5/00 | (2006.01) |
| G05D 9/00 | (2006.01) |
| G05D 11/00 | (2006.01) |
| G05D 17/00 | (2006.01) |
| H02H 3/00 | (2006.01) |
| H02H 7/00 | (2006.01) |
| H02H 1/00 | (2006.01) |
| H01H 73/00 | (2006.01) |

(52) U.S. Cl.
USPC ............... 700/286; 700/292; 361/62; 361/64; 361/114; 361/116

(58) Field of Classification Search
USPC ............... 700/286, 292; 361/62, 64, 114, 116
See application file for complete search history.

(56) References Cited

U.S. PATENT DOCUMENTS

| 4,062,052 A * | 12/1977 | Harper et al. .................... 361/28 |
| 4,245,318 A * | 1/1981 | Eckart et al. .................... 702/67 |
| 5,943,204 A * | 8/1999 | Jones et al. .................... 361/93.2 |
| 7,164,275 B2 | 1/2007 | Gasperi |
| 2005/0141163 A1 * | 6/2005 | Franke et al. .................... 361/94 |
| 2008/0036472 A1 | 2/2008 | Collins, Jr. et al. |
| 2008/0084213 A1 * | 4/2008 | Waite et al. .................... 324/424 |
| 2009/0021879 A1 * | 1/2009 | Rivers et al. .................... 361/93.2 |
| 2010/0097731 A1 * | 4/2010 | Franke et al. .................... 361/29 |
| 2011/0128005 A1 * | 6/2011 | Weiher .................... 324/424 |

OTHER PUBLICATIONS

International Search Report corresponding to co-pending International Patent Application Serial No. PCT/US2012/051989, European Patent Office, date Dec. 20, 2012; (5 pages).

International Written Opinion corresponding to co-pending International Patent Application Serial No. PCT/US2012/051989, European Patent Office, dated Dec. 20, 2012; (5 pages).

Schneider Electric; PowerPact® M-, P- and R-Frame, and Compact® NS630b-NS3200 Circuit Breakers Electronic Trip Systems; dated Aug. 2009; (3 pages).

* cited by examiner

*Primary Examiner* — Ronald Hartman, Jr.
(74) *Attorney, Agent, or Firm* — Locke Lord LLP (57) ABSTRACT

Centralized coordination of setting and adjusting trip settings of electronic circuit breakers in an electrical distribution system by monitoring short circuit current availability (SCCA) and adjusting trip settings based on received SCCA estimates from SCCA monitoring devices installed at main, feeder, and branch nodes of the distribution system. The SCCA monitoring devices are capable of automatically estimating the SCCA in the circuit or node at which the SCCA device is installed and transmitting SCCA estimates to a controller, which uses the SCCA estimates to coordinate adjustments to trip settings for the various circuit breakers. Depending on the node position of the circuit breaker and the corresponding SCCA at that node, the controller adjusts in real-time the short-circuit trip settings for the circuit breakers so that they are below the SCCA value. Optional user-inputted settings can affect the trip setting adjustments, such as transient loading conditions that can influence the SCCA estimates.

20 Claims, 4 Drawing Sheets

OPTIMIZED PROTECTION COORDINATION OF ELECTRONIC-TRIP CIRCUIT BREAKER BY SHORT CIRCUIT CURRENT AVAILABILITY MONITORING

FIELD OF THE INVENTION

Aspects of the present disclosure relate to systems and methods for coordinating electronic circuit breaker trip settings by short circuit current available (SCCA) monitoring.

BACKGROUND

Electronic-trip circuit breakers are used to control the flow of electricity through an electrical distribution system and to protect equipment and personnel from damage or harm in the event of an overcurrent or short-circuit event. Coordination of circuit breaker protection for overload current conditions can be consistently applied as the current constituting an overload condition is relatively low and can be defined according to the known physical and operational parameters of the electrical distribution system. However, coordination of circuit breaker protection for short-circuit conditions can be more difficult as the short circuit current can be inaccurate or difficult to estimate. Inaccuracies in estimation of the available short circuit current can be caused by a number of factors including: inaccurate estimation of short circuit current provided by the utility; transformer, cable, and connection impedances; stray line inductance and capacitance; other rotating machines present on the local electrical grid that can feed the fault; and lighting or other loads that effect system operation.

The advent of electronic-trip circuit breakers, such as the POWERPACT® circuit breakers available from Schneider Electric, brought about the ability to communicate with other control components in the electrical distribution system and to be adjusted through communication systems. Electronic circuit breakers allow for dynamic adjustment of their trip settings for optimized performance, thereby increasing system reliability, reducing potential damage from a short circuit, and preventing improper coordination of overcurrent protective devices in the presence of changes in the electrical distribution system.

U.S. patent application Ser. No. 12/903,540, filed on Oct. 13, 2010, entitled "Method of Estimating Short Circuit Current Available By Analysis of DC Charging Circuit," describes a method of accurate, real-time estimation of short circuit current available (SCCA) by examining the harmonic content of a non-linear load and correlating the harmonic response to a reference to determine SCCA at the point of monitoring.

What is needed is a way to use accurate SCCA estimation and reporting systems to optimally and automatically coordinate trip settings among circuit breakers in an electrical distribution system using the SCCA estimates.

BRIEF SUMMARY

Aspects of the present disclosure provide optimized performance in support of improved electrical distribution system reliability, by tripping only those circuit breaker(s) feeding a short circuit while all other equipment remains powered. With advanced estimates of anticipated short circuit current available, trip settings are adjusted dynamically without further user action. Changes to the electrical distribution system can be taken into account with additional details of system configuration, including the locations and arrangement of circuit breakers and SCCA monitoring points in the electrical distribution system.

Generally speaking, various aspects of the present disclosure receive real-time estimates of SCCA and use those estimates to change and coordinate trip settings of electronic circuit breakers that protect various circuits in an electrical distribution system. Additional user-defined settings or configuration information can be taken into account when adjusting and coordinating the trip settings. For example, information about transient loads can be inputted and received to adjust overload settings. Node position information about where in the electrical distribution system the SCCA monitoring points and electronic circuit breakers are installed can be inputted to coordinate trip settings among the electronic circuit breakers. For example, feeder circuit breaker settings are coordinated with all branch circuit breaker settings, and are adjusted to trip below the SCCA measured at the feeder node. Likewise, main circuit breaker settings are coordinated with all feeder circuit breaker settings, and are adjusted to trip below the SCCA measured at the main distribution node. Branch circuit breaker settings can be initially set to a minimum value, which can be overridden by a user according to specific branch load types and known transient operating conditions for a given branch circuit.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
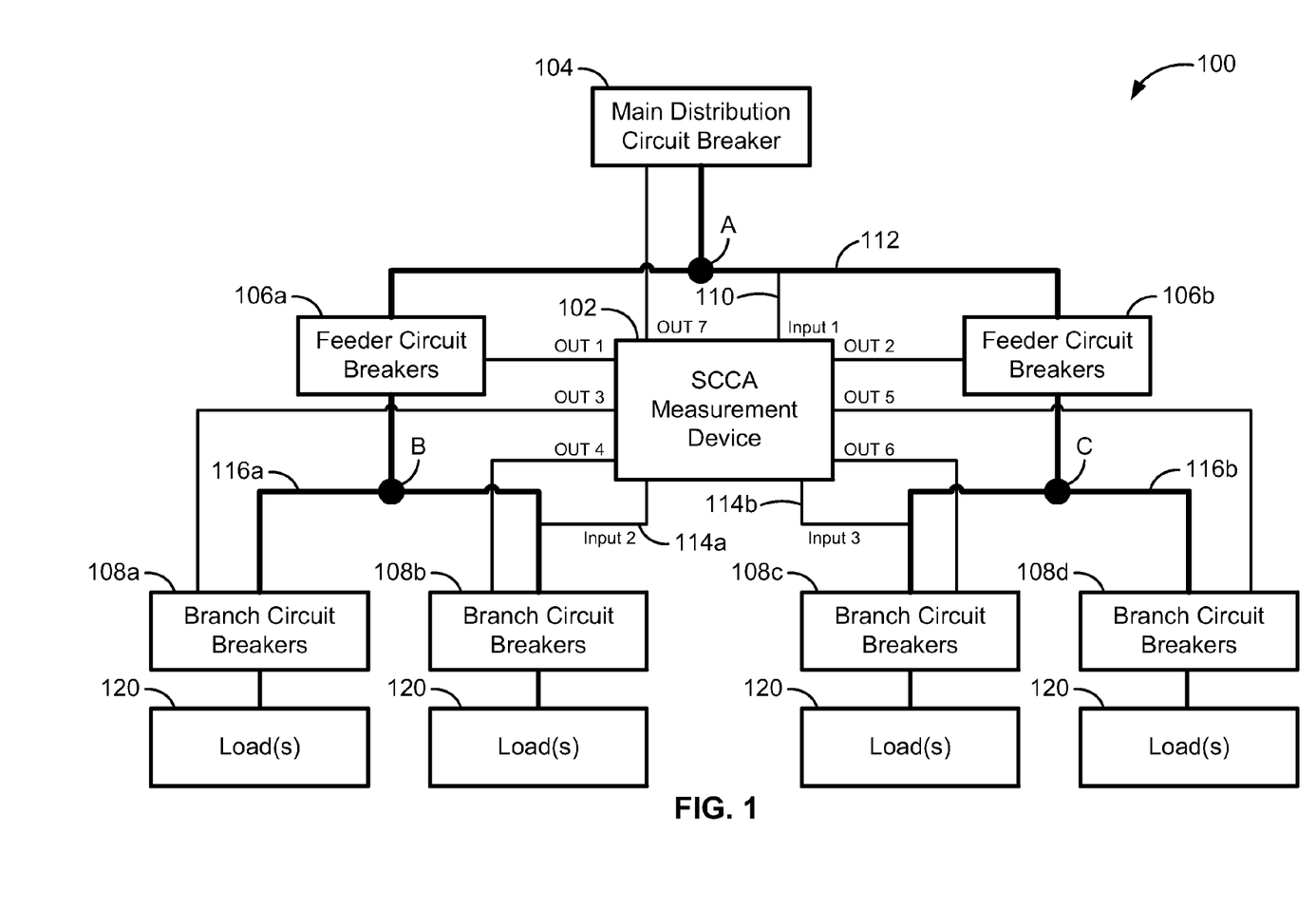
FIG. 1 is a functional block diagram of an exemplary configuration of electrical distribution system including an SCCA measurement device capable of estimating SCCA at various nodes in the electrical distribution system and adjusting trip settings of corresponding electronic circuit breakers.

FIG. 1 is a functional block diagram of an electrical distribution system 100, such as an alternating current (AC) electrical distribution system, which can distribute a single phase or multiple phases (e.g., two or three) of electricity to conductors or busses and associated pieces of equipment or loads within the electrical distribution system 100. The electrical distribution system 100 includes a short circuit current available (SCCA) measurement device 102 that is capable of measuring or estimating the SCCA, which, despite its awkward nomenclature, simply represents a measure of the amount of current that can be drawn from a particular node in an AC electrical circuit during a short-circuit event. The electrical distribution system 100 includes a main distribution circuit breaker 104 installed at electrical node A. A node refers to an electrical connection between two or more conductors or busses in the electrical distribution system 100.

In the exemplary configuration shown in FIG. 1, the electrical distribution system 100 includes three types of circuit breakers: a main distribution circuit breaker 104, two feeder circuit breakers 106*a,b*, and four branch circuit breakers 108*a-d*. The feeder circuit breakers 106*a,b* are connected to electrical node A, which receives electrical current supplied from a main service entrance from an electrical utility through the main distribution circuit breaker 104. The branch circuit breakers 108*a,b* are connected to electrical node B, which is fed electrical current from the feeder protected by the feeder circuit breaker 106*a*. Likewise, the branch circuit breakers 108*c,d* are connected to electrical node C, which is fed electrical current from the feeder protected by the feeder circuit breaker 106*b*. This configuration is merely exemplary, and is intended to facilitate discussion of the various types of circuit breakers found in common configurations of an electrical distribution system. The present disclosure is not limited to this particular configuration, and those of ordinary skill in the art will readily appreciate that there are numerous ways to configure an electrical distribution system, including configurations that lack, for example, feeder circuit breakers shown in the exemplary electrical distribution system 100 illustrated in FIG. 1.

The branch circuit breakers 108*a-d* are commonly configured to protect branch circuits. These branch circuits typically terminate with one or more loads or a piece of equipment (e.g., a motor) that are protected from damage caused by electrical faults by the corresponding branch circuit breakers 108*a-d*. Some of these loads can be transient in nature, which means that the amount of current they draw is transient or variable. For example, induction motors initially draw a surge of current, known as an inrush current, which causes transient loading of the branch circuit. These transient loads cause unpredictable and changing demands on the branch circuit that can cause that circuit's SCCA to fluctuate with the current demands of the loads.

The feeder circuit breakers 106*a,b* are configured to protect feeder circuits. A feeder circuit sits between a main distribution circuit and a branch circuit breaker, whereas a branch circuit sits between a branch circuit breaker and one or more loads 120 consuming current drawn through the branch circuit breaker. Although each load is referenced by the same number 120, each load can be different pieces of equipment or types of loads (e.g., a motor load or a lighting load). A feeder circuit typically includes relatively large conductors or busses to carry the electrical current from the main distribution circuit to smaller conductors that feed the branch circuits.

The SCCA device 102 has an input 110 connected to a main distribution conductor or bus 112 for detecting a characteristic of electricity flowing through the conductor 112 and two other inputs 114*a*, 114*b* each connected to the feeder conductors or busses 116*a*, 116*b*. Because there are a total of seven circuit breakers 104, 106*a-b*, 108*a-d* shown in FIG. 1, the SCCA device 102 has a corresponding output connected to each of the circuit breakers 104, 106*a-b*, 108*a-d*. These outputs are labeled OUT1 through OUT7 in FIG. 1. The SCCA device 102 includes one or more controllers (not shown, but like the controller 220 described in FIG. 2 below) for executing instructions recorded on a non-transitory computer-readable medium or media.

Figure 2:
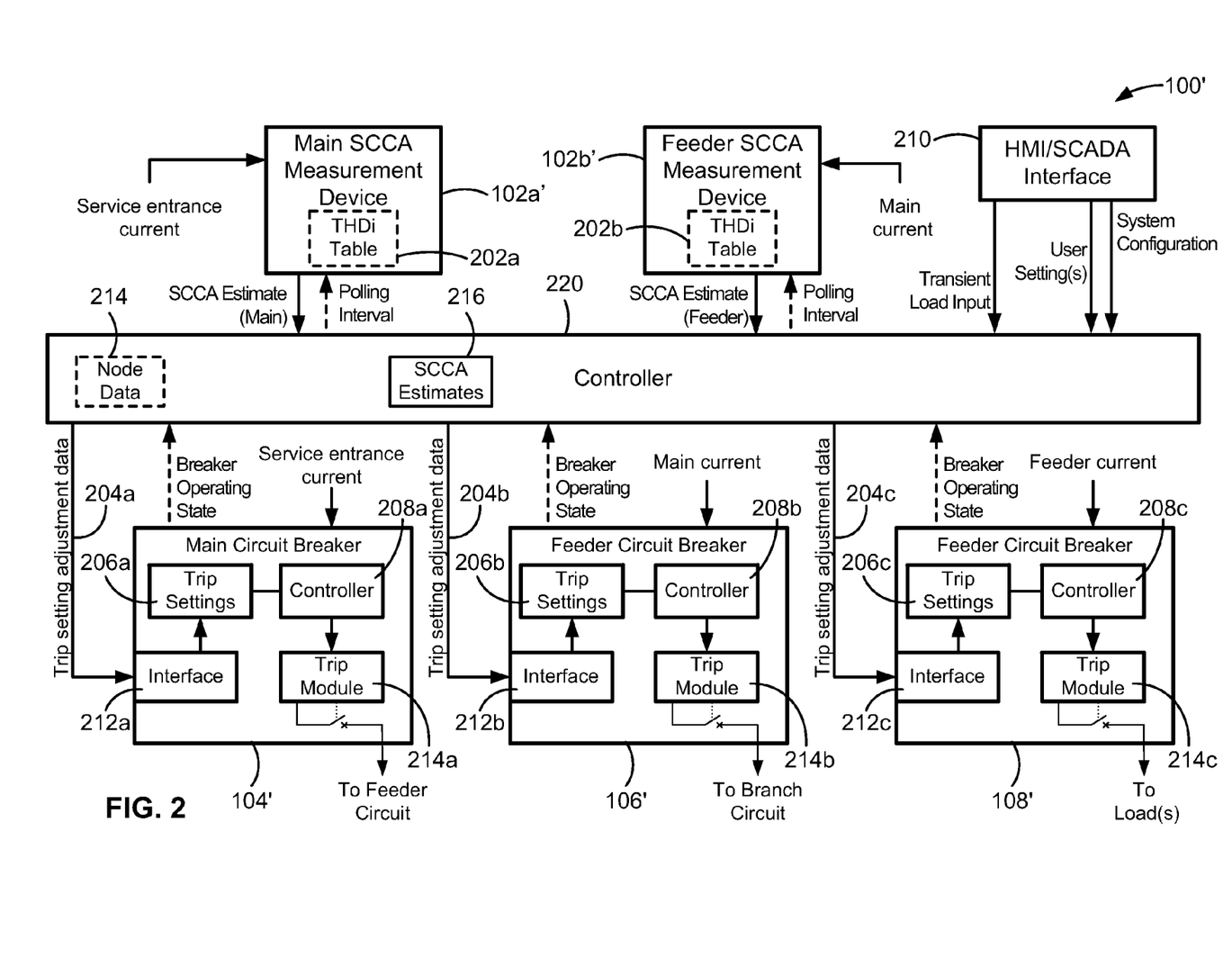
FIG. 2 is a functional block diagram of another exemplary configuration of an electrical distribution system including one or more controllers operable to receive SCCA estimates from multiple SCCA devices and optional user-defined settings or inputs to adjust trip settings of electronic circuit breakers in the electrical distribution system.

FIG. 2 is a functional block diagram of an electrical distribution system 100' configured with multiple SCCA devices 102*a'*, 102*b'* like the SCCA device 102 shown in FIG. 1, where like reference numbers refer to like components, and one or more controllers 220. Unlike FIG. 1 in which a single SCCA device 102 monitors the current flowing through the main distribution conductor 112 and the feeder conductors 116*a,b*, in FIG. 2, separate SCCA devices 102*a'*, 102*b'* separately monitor main and feeder circuits, respectively, in the electrical distribution system 100' and provide their outputs to one or more controllers 220. Both configurations are contemplated by the present disclosure, but for ease of discussion, aspects of the present disclosure will be discussed with reference to the configuration shown in FIG. 2. The same electrical nodes A, B, C will be used to refer to the same node positions shown in FIG. 1, namely that the main distribution circuit breaker 102, 102' is connected to node A, the feeder circuit breakers 106*a,b*, 106' are connected between nodes A and B and between nodes A and C, respectively, and the branch circuit breakers 108*a-d*, 108*a'* are connected to nodes B and C, respectively.

Any of the SCCA devices 102, 102*a'*, 102*b'* described herein are capable of automatically determining an estimate of SCCA in the circuit or node that the SCCA device is monitoring, and storing and/or transmitting that estimate to another component in the electrical distribution system 100, 100', such as the controller 220. Each of the SCCA device 102, 102*a'*, 102*b'* monitors a characteristic of the circuit to which the SCCA device 102, 102*a'*, 102*b'* is connected and determines an SCCA estimate based on the monitored characteristic. The monitored characteristic can be electrical current, for example. In an exemplary implementation, the SCCA device 102, 102*a'*, 102*b'* can determine the SCCA from a total harmonic current distortion (THDi) based on a set of monitored current values measured by the SCCA device 102, 102*a'*, 102*b'*. Examples of suitable methods and systems for accurately estimating SCCA in real-time are provided in U.S. patent application Ser. No. 12/903,540, filed on Oct. 13, 2010, entitled "Method of Estimating Short Circuit Current Available By Analysis of DC Charging Circuit," which describes methods and systems for accurate, real-time estimation of SCCA by examining the harmonic content of a non-linear load and correlating the harmonic response to a reference to determine SCCA at the point of monitoring. For example, the determined THDi can be compared with a table 202*a,b* of predetermined THDi values that correspond to quantities of SCCA. The SCCA device 102, 102*a'*, 102*b'* selects the value of THDi closest or equal to the determined THDi to reach an estimate of a quantity of SCCA. Any other suitable techniques for estimating, storing, and reporting SCCA in a circuit being monitored are contemplated. The particular methodology or technique applied for estimating SCCA is not a focus of aspects of the present disclosure or necessary for carrying out aspects of the present disclosure.

The controller 220 is programmed with instructions stored on a non-transitory computer-readable medium, such as an electronic memory device. These instructions, when executed by one or more processors, cause one or more computing devices to perform operations according to instructions for automatically causing a trip setting of an electronic circuit breaker in the electrical distribution system 100, 100' to be adjusted by monitoring estimates of SCCA. Reference to exemplary ones of these instructions will be made to FIGS. 3 and 4 with parentheticals indicating the functional blocks being described. As noted above, the controller 220 can be one or more controllers in communication with one another such as over a network or in a master/slave configuration in which one or more slave controllers, which respond to the command and coordination of a master controller, collect SCCA estimates and transmit trip adjustment setting changes to corresponding electronic circuit breakers 104, 104', 106a, b, 106', 108a,b,c,d, 108'. Further, the controller 220 can be incorporated into the SCCA device 102 shown in FIG. 1. Each electronic circuit breaker, such as 104, 104', 106a,b, 106', 108a,b,c,d, 108' includes trip setting data, indicated by reference numbers 206a,b,c in FIG. 2, stored in a memory in the electronic circuit breaker. For ease of discussion, when referring to an electronic circuit breaker, reference will be made to the electronic circuit breaker 104, though it should be understood that descriptions of the electronic circuit breaker 104 apply equally to the other electronic circuit breakers 104', 106a,b, 106', 108a,b,c,d, 108' shown in the drawings.

Figure 3:
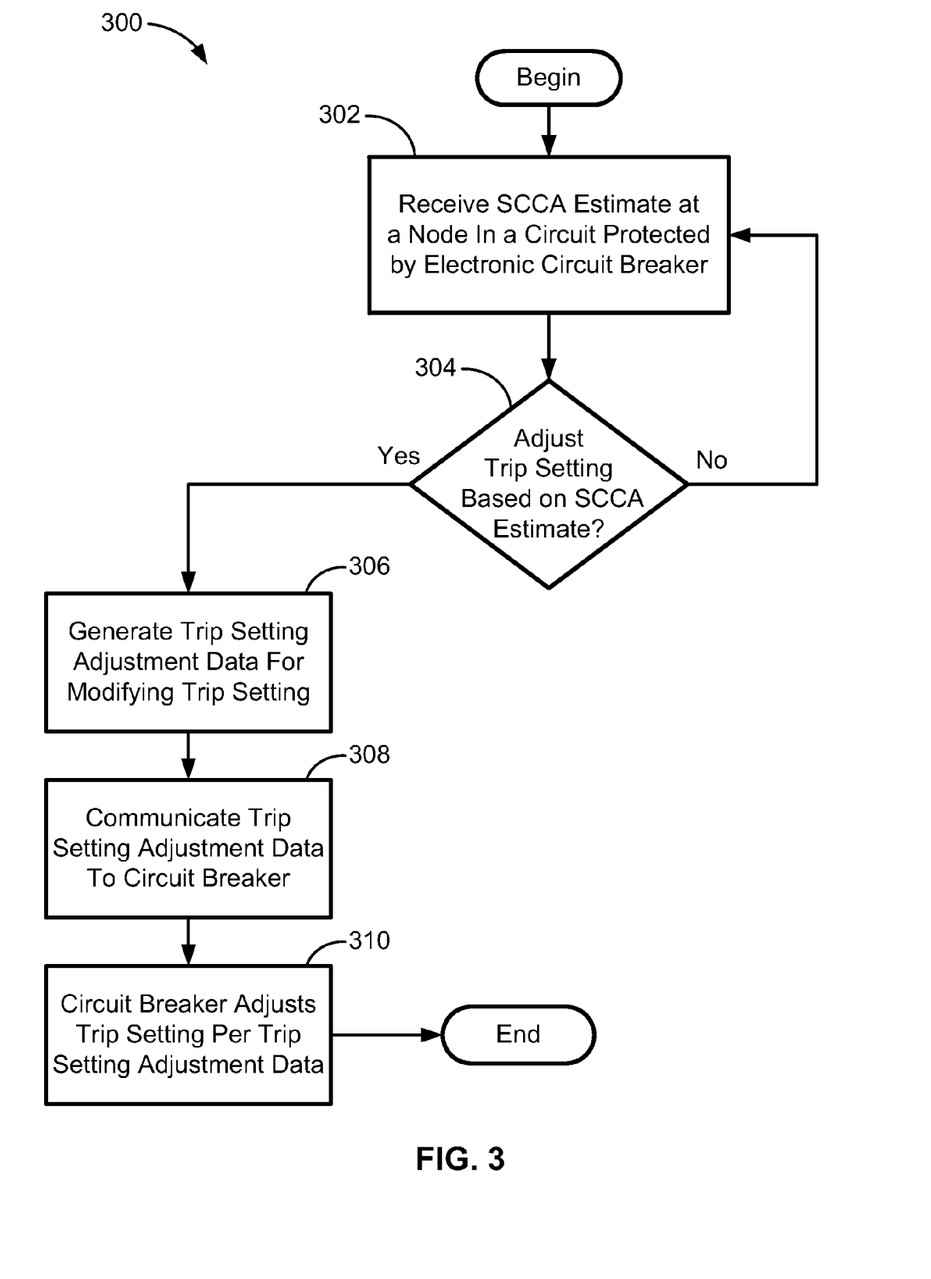
FIG. 3 is a flowchart diagram of an exemplary algorithm for automatically causing a trip setting of an electronic circuit breaker in an electrical distribution system shown in FIG. 1 or 2 to be adjusted by monitoring SCCA estimates.

The controller 220 receives an estimate of SCCA at a node (e.g., A, B, or C) in a circuit (e.g., a main distribution circuit, a feeder circuit, or a branch circuit) that a first electronic circuit breaker 104 is protecting (302). The received SCCA estimates are stored as SCCA estimates data 216 in a memory associated with the controller 220. The memory (not shown) can be conventionally integrated into the controller 220 on the same substrate or operably connected to the controller 220 on a separate substrate. These estimates can be transmitted by the SCCA devices periodically in accordance with a predetermined polling interval or a polling interval communicated by the controller 220. The controller 220 determines based on the received SCCA estimate whether to adjust the trip setting of the first electronic circuit breaker (304). The trip setting includes a short-circuit condition that if exceeded causes the first electronic circuit breaker to trip thereby disconnecting the circuit from the node to which the first electronic circuit breaker is connected. If the controller 220 determines that the trip setting 206a,b,c is to be adjusted, the controller 220 generates trip setting adjustment data indicative of a modification to the trip setting 206a,b,c of the electronic circuit breaker (308) and communicating to the electronic circuit breaker a signal on lines 204a,b,c to cause thereby the electronic circuit breaker to adjust the trip setting 206a,b,c in accordance with the modification (310).

The electronic circuit breaker 104 includes a controller 208a,b,c programmed to cause the electronic circuit breaker 104 to trip in response to a current (e.g., a service entrance, main, or feeder current) monitored by the electronic circuit breaker 104 exceeding a threshold stored in a memory of the electronic circuit breaker 104. The circuit breaker 104 includes a communications interface 212a,b,c that receives the modification by way of the trip setting adjustment data signal line 204a,b,c and adjusts its short-circuit trip setting 206a,b,c such that the short-circuit trip setting 206a,b,c causes a trip module 214a,b,c of the circuit breaker 104 to trip at a current level detected by the circuit breaker 104 below the SCCA estimate. The trip settings 206a,b,c stored in the electronic circuit breaker 104 can include other trip settings besides a short-circuit trip setting, including a long-time trip setting, a ground-fault trip setting, a short-time trip setting, an instantaneous trip setting, or an overload trip setting. The electronic circuit breaker 104 can be based on, for example, any of the POWERPACT® family of circuit breakers available from Schneider Electric with handle ratings ranging between 15 A and 3000 A.

The controller 220 can receive system configuration information from a human-machine interface (HMI) or Supervisory Control and Data Acquisition (SCADA) interface 210 indicating whether the circuit being monitored is a main distribution circuit, a feeder circuit, or a branch circuit of the electrical distribution system 100, 100'. Typically, the system configuration information can be inputted immediately after commissioning of the electrical distribution system 100, 100' where the circuit breakers 104, 104', 106a,b, 106', 108a,b,c,d, 108' and SCCA devices 102, 102a', 102b' are by default configured with factory or default configuration settings. The controller 220 interprets the received system configuration information to determine the type of circuit (e.g., main distribution, feeder, or branch). If the controller 220 determines that the circuit is a branch circuit, such as a circuit downstream of node B or C shown in FIG. 1, the circuit breaker 104 sets its trip setting 206a,b,c to a minimum value, such as a minimum short-circuit trip setting value allowed by an HMI short-circuit trip setting for the circuit breaker 104 under consideration. The system configuration information can identify the node (e.g., A, B, or C) in the electrical distribution system 100, 100' at which the SCCA estimate is determined and the node position of the electronic circuit breaker 104 in the electrical distribution system (e.g., between nodes A and B, or at node A).

The HMI/SCADA interface can be incorporated into any of the SCCA devices or electronic circuit breakers disclosed herein, or can be incorporated into a remote computer system (not shown) in communication with the controller 220, or a stand-alone unit or device from the SCCA devices and circuit breakers. It is depicted in FIG. 2 as a separate functional block, but it can be incorporated into any of the aforementioned apparatuses.

Information about the circuit types and the breaker positions relative to the nodes is stored in, for example, a mathematical matrix format, as node data 214 in a memory in or associated with the controller 220. An example of system configuration includes SCCA device node position information indicating that the main SCCA device 102a' is connected at node A in the electrical distribution system 100, 100', and the feeder SCCA device 102b' is connected between nodes A and B in the electrical distribution system 100, 100'. This information can be stored as node data 214 in a memory associated with the controller 220. Another example of system configuration indicating circuit breaker position includes that the circuit breaker 106a is in a feeder circuit between nodes A and B, and is of a type 1200 A POWERPACT® P-frame molded-case circuit breaker available from Schneider Electric. This information can be stored as node data 214 in the memory associated with the controller 220. The controller 220 can assign each node (A, B, C) a unique value and associate each SCCA device and circuit breaker with the corresponding unique value or values to indicate the position of these devices in the electrical distribution system 100, 100'.

The controller 220 can also or alternately receive from the HMI/SCADA interface 210 a transient load input indicative of a transient load condition associated with a transient load 120, such as a polyphase induction motor, connected to the circuit, or indicative of a load type, such as an induction motor, a non-linear controller (e.g., a drive or ballast), or a linear load (e.g., incandescent lighting). The controller 220 sends trip setting adjustment data on one of the lines 204a,b,c to the circuit breaker 104 to cause the circuit breaker 104 to set an overload trip setting in accordance with the inputted transient load condition. The transient load condition can include a maximum load inrush current profile associated with the transient load 120, which defines a maximum inrush current for the transient load 120. The transient loading condition can be selected by a pre-determined curve profile or by a user-configured curve (via the HMI/SCADA interface 210) to set overload settings. Alternately, the user can create a custom protection curve, which is inputted via the HMI/SCADA interface 210 to the controller 220.

The controller 220 can generate the trip adjustment data that is sent over the lines 204a,b,c based on one or more user settings received from the HMI/SCADA interface 210 that affects how the trip setting 206a,b,c in the circuit breaker 104 is to be modified. The user setting can include a type of load connected to the circuit, such as a transient load.

Figure 4:
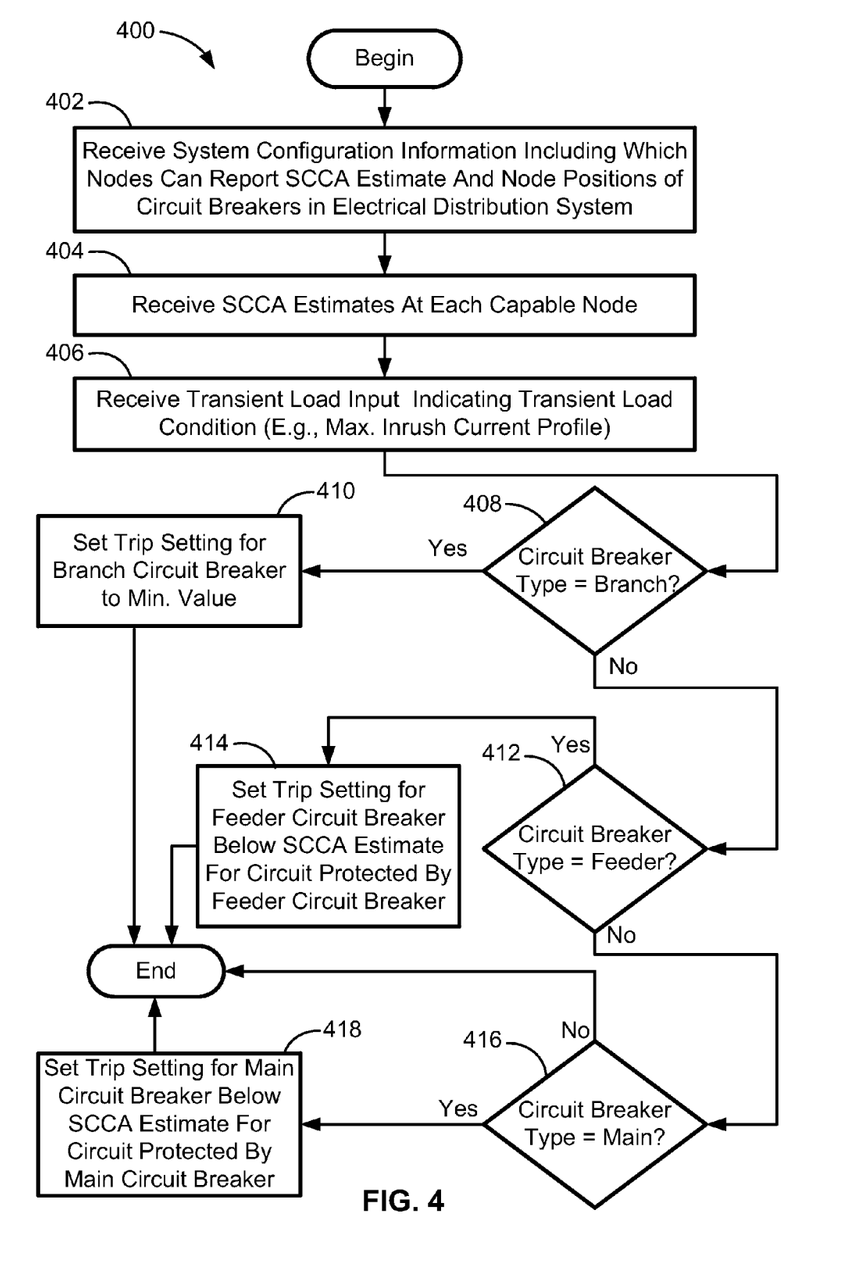
FIG. 4 is a flowchart diagram of an exemplary algorithm for coordinating adjustment of trip settings among electronic circuit breakers installed at predetermined nodes of an electrical distribution system shown in FIG. 1 or 2 by monitoring SCCA estimates.

The controller 220 can also facilitate coordination of adjustment of the trip settings 206a,b,c among the various electronic circuit breakers 104 installed at predetermined nodes (e.g., A, B, C) of the electrical distribution system 100, 100' by monitoring estimates of SCCA. The controller receives system configuration information that includes information concerning which nodes are in the electrical distribution system 100, 100' are capable of reporting an estimate of SCCA. The system configuration information further includes information (e.g., in matrix format) concerning the node positions of the electronic circuit breakers 104 installed at the predetermined nodes (e.g., A, B, C) of the electrical distribution system 100, 100' (402). The controller 220 receives SCCA estimates at each of the capable nodes set forth in the system configuration information (404). The controller 220 optionally receives a transient load input indicative of a transient load condition associated with a transient load (such as any of the loads 120) connected to the one of the circuit breakers 104 (406). The controller determines whether each of the electronic circuit breakers 104 is connected to a main circuit, a feeder circuit connected to the main circuit, or a branch circuit connected to the feeder circuit in the electrical distribution system 100, 100'.

If the circuit breaker type is indicated to be a branch circuit breaker (408), the controller 220 instructs that branch circuit breaker 108, 108' by way of the trip setting adjustment data on the line 204a to set its trip setting to a minimum value (410). One of several factors can be considered in establishing the minimum value including: a) user-custom setting of the trip unit adjustment, either through physical adjustment at the circuit breaker, (b) adjustment to the circuit breaker trip parameters through the HMI/SCADA interface 210, (c) load characterization facilitated previously by the SCADA system, or (d) the measured short circuit current availability measured at the up-stream feeder distribution bus. The four factors are considered in establishing the branch circuit protective settings, with the last (measure of SCCA) affecting selection of instantaneous trip setting exclusively.

If the circuit breaker type is indicated to be a feeder circuit breaker (412), the controller 220 instructs that feeder circuit breaker 106, 106' on the line 204b to set its trip setting to a value below the received SCCA estimate for the node (e.g., node B) to which the feeder circuit breaker is connected in the electrical distribution system 100, 100' (414). The feeder circuit breaker 106a,b, 106' is instructed to coordinate its settings first with all branch circuit breaker settings and other feeder circuit breakers connected downstream of the feeder circuit breaker 106a,b, 106'. Adjustment of the instantaneous trip setting for feeder circuit breakers is prioritized first to be below the measured SCCA of the feeder bus supplying power to the feeder circuit breaker 106a,b, 106', and then to be the maximum instantaneous trip rating of any feeder or branch circuit breakers connected downstream of the feeder circuit breaker 106a,b, 106'.

If the circuit breaker type is indicated to be a main circuit breaker (416), the controller 220 instructs the main circuit breaker 104, 104' to set its trip setting to a value below the received SCCA estimate for the node A to which the main circuit breaker 104, 104' is connected in the electrical distribution system 100, 100' (418). The main circuit breaker 104, 104' is instructed to coordinate its settings first with those of all feeder and branch circuit breakers connected downstream of the main circuit breaker 104. Adjustment of the instantaneous trip setting for the main circuit breaker is prioritized first to be below the measured SCCA of the main bus supplying power to the main circuit breaker 104, and then to be the maximum instantaneous trip rating of any feeder or branch circuit breakers connected downstream of the main circuit breaker 104.

If the protective device is a fuse type instead of a circuit breaker, or a circuit breaker that is not compatible with the automated coordination system of the present disclosure, the static protective curve can be manually inputted including the following information: location within the electrical distribution system 100, 100' in which the protective device is installed; or protection curve approximation according to published manufacturer information. The HMI/SCADA 210 can consider these "incompatible" protective devices in calculations as described above for automated setting of adjustable circuit breakers; however no change to the protective devices themselves need to be undertaken or assumed.

During typical operating conditions, the system 100, 100' periodically polls the measurement of SCCA from all monitoring points, making curve adjustments first to the branch circuit breakers, then to feeder and main circuit breakers respectively, to maintain proper branch/feeder coordination, and to respect any changes to measured short circuit current rating observed during periodic polling.

Other events can trigger additional polling of the system 100, 100', including a detected short circuit and tripping event, connection or disconnection of circuit loads that might impact the system 100, 100' such as additional local battery/generation or other local rotating machines.

Maintenance and special operating conditions can be considered and can facilitate automatic changes to circuit breaker trip settings according to a custom "default" configuration. These settings are at the discretion of the end user and based on the type of special or maintenance condition to be undertaken.

As shown in FIG. 2, some or all of the electronic circuit breakers 104', 106', 108' can transmit their corresponding operating state (e.g., on, off, or tripped) to the controller 220, which coordinates the trip setting adjustments for all of the circuit breakers in the electrical distribution system 100, 100' such that if one of the circuit breakers trips in response to a short circuit event, the other circuit breakers remain energized and do not trip. In an on state, a circuit breaker is energized, permitting current to flow through the circuit breaker to a downstream circuit or load. In an off state, the circuit breaker is disconnected from the circuit or load to which it is connected. Conventionally, the off state is triggered by manually moving a handle of the circuit breaker to an off position, which separates a pair of electrical contacts inside the circuit breaker, thereby interrupting the flow of current through the breaker. In a tripped state, the circuit breaker has detected a fault, such as a short-circuit fault, a ground fault, an arc fault, an over-current fault, or the like, and automatically causes the trip module 214 to trip the breaker by separating the pair of contacts. By coordinating the trip settings for the circuit breakers in the electronic distribution system 100, 100', the controller 220 provides improved system reliability by tripping only those circuit breakers feeding the short circuit while other equipment protected by other circuit breakers remain powered.

Aspects of the present disclosure advantageously automate the configuration of an electrical distribution system 100, 100' by identifying the locations of circuit breakers within the electrical distribution system 100, 100' to optimize and facilitate proper coordination of the trip settings among the circuit breakers. The controller 220 dynamically and periodically monitors the electrical distribution system 100, 100' for changes in the operational state of the circuit breakers that might affect proper circuit breaker coordination and trip settings. The controller 220 can also monitor the SCCA measured at the conductors or busses in the electrical distribution system 100, 100' and adjust the coordination settings, such as the instantaneous-trip short circuit settings of circuit breakers, to minimize the potential for equipment damage and to maximize system reliability in the face of electrical short circuit events. The algorithms described herein can respond to user-defined inputs or settings for specific circuit breakers and adjust coordination parameters of circuit breakers to accommodate the user-defined settings. The algorithms disclosed herein are adaptive and can be adjusted as needed for expansion of the electrical distribution system 100, 100' through addition of circuit breakers and/or SCCA monitoring devices. In some implementations, only a single controller 220 provides centralized coordination of the trip settings of circuit breakers in an electrical distribution system 100, 100'.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically causing a trip setting of an electronic circuit breaker in an electrical distribution system to be adjusted by monitoring estimates of short circuit current available (SCCA), comprising:
   receiving an estimate of SCCA at a node in a circuit that a first electronic circuit breaker is protecting;
   determining based on the SCCA estimate whether to adjust the trip setting of the first electronic circuit breaker, the trip setting including a short-circuit condition that if exceeded causes the first electronic circuit breaker to trip thereby disconnecting the circuit from the node; and
   responsive to determining that the trip setting is to be adjusted,
      generating trip setting adjustment data indicative of a modification to the trip setting of the electronic circuit breaker and
      communicating to the electronic circuit breaker a signal to cause thereby the electronic circuit breaker to adjust the trip setting in accordance with the modification.

2. The method of claim 1, wherein the first electronic circuit breaker includes a controller programmed to cause the first electronic circuit breaker to trip in response to a current monitored by the first electronic circuit breaker exceeding a threshold stored in a memory of the first electronic circuit breaker, and wherein the modification includes an adjustment to the short-circuit trip setting such that the short-circuit trip setting causes the circuit breaker to trip at a current level detected by the circuit breaker below the SCCA estimate.

3. The method of claim 1, further comprising:
   determining whether the circuit is a main distribution circuit, a feeder circuit, or a branch circuit of the electrical distribution system; and
   responsive to determining that the circuit is the branch circuit, setting the trip setting of the first electronic circuit breaker to a minimum value.

4. The method of claim 1, further comprising:
   receiving a transient load input indicative of a transient load condition associated with a transient load connected to the circuit; and
   setting an overload trip setting of the first electronic circuit breaker in accordance with the inputted transient load condition.

5. The method of claim 4, wherein the transient load condition includes a maximum load inrush current profile associated with the transient load and defining a maximum inrush current for the transient load.

6. The method of claim 1, further comprising receiving an input indicative of a system configuration that identifies the node in the electrical distribution system at which the SCCA estimate is determined and the node position of the first electronic circuit breaker in the electrical distribution system.

7. The method of claim 1, wherein the generating the trip adjustment data includes receiving an input indicative of a user setting that affects the modification to the trip setting.

8. The method of claim 1, wherein the user setting includes a type of load connected to the circuit, wherein the type of load includes a transient load.

9. The method of claim 1, wherein the SCCA estimate is received from a short circuit current availability (SCCA) device configured to monitor a characteristic of the circuit to which the SCCA device is connected and to determine the SCCA estimate based on the monitored characteristic.

10. The method of claim 9, wherein the characteristic is current, and the SCCA estimate is determined from a total harmonic current distortion based on a set of monitored current values measured by the SCCA device.

11. A method of coordinating adjustment of trip settings among electronic circuit breakers installed at predetermined nodes of an electrical distribution system by monitoring estimates of short circuit current available (SCCA), comprising:
   receiving system configuration information indicative of capable ones of the nodes in the electrical distribution system capable of reporting an estimate of SCCA and of the node positions of the electronic circuit breakers installed at the predetermined nodes of the electrical distribution system;
   receiving estimates of SCCA at each of the capable nodes; and
   causing a trip setting of a selected one of the electronic circuit breakers to be adjusted based on at least the system configuration information and the SCCA estimate associated with the node at which the selected circuit breaker is installed.

12. The method of claim 11, further comprising:
   receiving a transient load input indicative of a transient load condition associated with a transient load connected to the one of the circuit breakers, wherein the adjusting the trip setting is further based on the input.

13. The method of claim 11, wherein the causing includes:
   determining whether each of the circuit breakers is connected to a main circuit, a feeder circuit connected to the main circuit, or a branch circuit connected to the feeder circuit in the electrical distribution system;

responsive to the determining, setting the trip setting of a determined one of the circuit breakers connected to the branch circuit to a minimum value;

responsive to the determining, setting the trip setting of a determined one of the circuit breakers connected to the feeder circuit to a value below the SCCA estimate for the node to which the determined circuit breaker connected to the feeder circuit is connected; and responsive to the determining, setting the trip setting of a determined one of the circuit breakers connected to the main circuit to a value below the SCCA estimate for the node to which the determined circuit breaker connected to the main circuit is connected.

14. The method of claim 13, further comprising:

receiving a transient load input indicative of a transient load condition associated with a transient load connected to the one of the circuit breakers, wherein the adjusting the trip setting is further based on the transient load input.

15. The method of claim 14, wherein the transient load condition includes a maximum load inrush current profile associated with the transient load and defining a maximum inrush current for the transient load.

16. The method of claim 11, wherein each of the electronic circuit breakers includes a controller programmed to cause the corresponding electronic circuit breaker to trip in response to a current monitored by the corresponding electronic circuit breaker exceeding a threshold stored in a memory of the corresponding electronic circuit breaker, each of the electronic circuit breakers further including a communication interface configured to receive trip setting adjustment information indicating a modification to the trip setting of the corresponding electronic circuit breaker.

17. The method of claim 11, further comprising receiving from each of the electronic circuit breakers an operating state of the corresponding electronic circuit breaker, the operating state indicating whether an operating state of the electronic circuit breaker is on, off, or tripped, wherein the causing the trip setting to be adjusted causes a short-circuited one of the electronic circuit breakers to trip in response to a short circuit occurring in the circuit protected by the short-circuited electronic circuit breaker, without causing others of the electronic circuit breakers to be tripped.

18. The method of claim 11, wherein the estimates of SCCA are received from corresponding SCCA devices each configured to monitor a characteristic of the circuit to which the SCCA device is connected and to determine the SCCA estimate based on the monitored characteristic.

19. The method of claim 18, wherein the characteristic is current, and the SCCA estimate is determined from a total harmonic current distortion based on a set of monitored current values measured by the corresponding SCCA device.

20. A non-transitory computer-readable medium storing instructions for automatically causing a trip setting of an electronic circuit breaker in an electrical distribution system to be adjusted by monitoring estimates of short circuit current available (SCCA), wherein the instructions, when executed by one or more processors, cause one or more computing devices to perform operations comprising:

receiving an estimate of SCCA at a node in a circuit that a first electronic circuit breaker is protecting;

determining based on the SCCA estimate whether to adjust the trip setting of the first electronic circuit breaker, the trip setting including a short-circuit condition that if exceeded causes the first electronic circuit breaker to trip thereby disconnecting the circuit from the node; and responsive to determining that the trip setting is to be adjusted, generating trip setting adjustment data indicative of a modification to the trip setting of the electronic circuit breaker and communicating to the electronic circuit breaker a signal to cause thereby the electronic circuit breaker to adjust the trip setting in accordance with the modification.

* * * * *